May 27, 1924.

J. A. ROLAND

ARTIFICIAL BAIT

Filed May 10, 1922

1,495,927

INVENTOR
JAMES A. ROLAND
By Chindade & Parker & Carlson
ATTYS.

Patented May 27, 1924.

1,495,927

UNITED STATES PATENT OFFICE.

JAMES A. ROLAND, OF CHICAGO, ILLINOIS.

ARTIFICIAL BAIT.

Application filed May 10, 1922. Serial No. 559,749.

*To all whom it may concern:*

Be it known that I, JAMES A. ROLAND, a citizen of the United States, residing at Chicago, in the county of Cook and State of Illinois, have invented a certain new and useful Artificial Bait, of which the following is a specification.

The invention relates to artificial bait of the type comprising a body portion simulating a minnow or other form of live bait, and having operatively associated therewith devices movable as the bait is drawn through the water, in such a manner as to impart a life-like action to the bait.

The general aim of my invention has been to produce a fish bait of this general character which will be more effective as a lure, and which is so constructed as to be capable of conversion at the will of the user into baits of various kinds through the use of interchangeable parts differing in size, shape and general appearance.

More specifically stated, one object of the invention is to provide a fish bait having a hook rotatable with respect to the body and means for effecting the rotation of the hook as the bait is drawn through the water, thus rendering it more effective as a lure.

Still another object of the invention is to provide a fish bait having a construction such that the body or hook or either of them may be replaced at the will of the user by corresponding elements of varying sizes or types.

A further object of the invention is to provide an improved means for concealing the hook of the bait.

A general object is to provide a construction and arrangement of the parts which enables its manufacture upon an economical basis, and which renders it possible for the user to assemble and disassemble the parts with substantial ease and facility.

I have shown herein but a single embodiment of the invention. It is contemplated, however, that various changes in the form, construction and arrangement of the parts may be made by those skilled in the art without departing from the spirit and scope of the invention as expressed in the appended claims.

Figure 1:
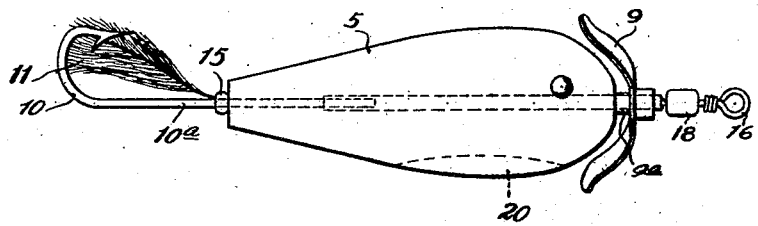
Figure 2:
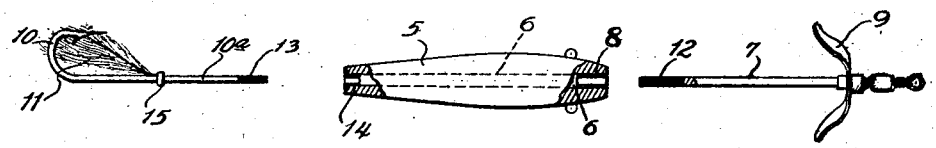
Figure 3:
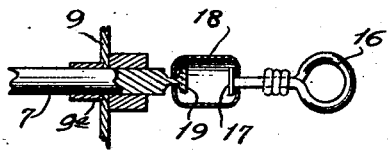
Figure 4:
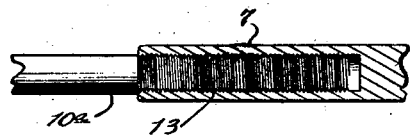

In the drawings, Figure 1 is a side elevation of a bait embodying my invention. Fig. 2 is a top plan view of the parts of the bait shown in detached relation and with parts broken away to show details of construction. Fig. 3 is a fragmentary detail view illustrating the connection for the line. Fig. 4 is a fragmentary sectional view showing a detail of construction.

The bait comprises generally a body 5 simulating in the present instance a minnow. This body has a longitudinal bore 6 extending therethrough for the purpose of receiving a spindle 7 of a length somewhat less than the body. The forward end of the spindle 7 is journaled in a sleeve or bearing 8 secured within the forward end of the bore 6, and it has rigid therewith a spinner or propeller 9 with inclined blades adapted to rotate the spindle. Rigid with the spinner is a collar $9^a$ which engages with the extreme forward end of the sleeve or bearing 8 to limit the rearward movement of the spindle into the body.

The rear end of the spindle 7 is adapted for connection with the shank $10^a$ of a hook 10. Thus it is provided with a screw-threaded socket 12 adapted to receive the screw-threaded end 13 of the hook shank. The hook is thus detachably connected with the spindle 7, but is rigid therewith so that in the rotation of the spindle by the spinner 9 the hook is also caused to rotate. Within the bore 6 at the rear end of the body 5 is a bushing 14 flanged at its rear end to form a bearing for a collar 15 fast upon the shank $10^a$. This collar constitutes a stop limiting the rearward movement of the body with respect to the spindle.

For the purpose of concealing the hook 10 and to serve as an additional means of attraction in the rotation of the hook, a feather 11 or other suitable means is mounted upon the shank of the hook. In the present instance, I utilize the collar 15 for this purpose the collar being made sufficiently large so that at one side of the shank it provides an aperture in which the stem end of the feather may be made fast.

The bait is drawn through the water in the usual way, through the medium of a connection shown in detail in Fig. 3. This connection comprises an eye 16 formed of wire and having a shank provided at its free end with a head in the form of a disk 17. Through the medium of this head and a coupling member 18, the eye is connected to the extreme forward end of the spindle 7 which is provided with a rigid ball 19 loosely engaged by the coupling. The latter may be in the form of a sleeve having its ends inturned to provide apertures of sufficient size only to receive the shank of the eye and the stem with which the head 19 is rigid. This construction provides a ball-and-socket joint between the eye and the spindle of the bait, and reduces friction to a minimum whereby the spindle may be driven through the action of the spinner blades 9 at a high rate of speed.

In the use of the bait, the body 5 maintains an upright floating position while the spindle together with the hook revolves. Such upright position of the body is insured by the provision of a counterweight in the lower side of the body which may be of any suitable form such, for example, as a strip of lead 20 embedded in the underside of the body. The latter thus remains stationary with reference to the spindle 7 and hook 10, which latter, when operatively associated, constitutes a shaft propelled by the spinner 9 to actuate the hook 10. Such rotation of the hook, it will be seen, renders the same more effective.

In addition to its function as a propeller, the spinner 9 constitutes a means of attraction; and the feather 11 rotating with the hook 10 serves as an additional means of attraction.

The detachable connection which I have provided between the shank of the hook and the spindle makes it possible to vary the size, type or design of the body of the bait at will, or the size of the hook, or both, as may be desired. Thus it will be observed it becomes possible with my invention, through the mere replacement of certain of the parts by corresponding parts of varied size and design, to obtain a large variety of baits. This reduces the amount of equipment necessary or desirable, lessens the cost thereof, and at the same time the change from one type of bait to another may be effected with maximum ease and facility.

I claim as my invention:

1. An artificial fish bait comprising, in combination, a body having a through bore, a shaft upon which said body is mounted for relative rotation, a hook rigid with the shaft, and a spinner for driving the shaft.

2. An artificial fish bait comprising a body having a shaft extending longitudinally therethrough and rotatable relative thereto, means for rotating the shaft, and a hook rigid with the shaft, said hook and body or either of them being detachable from the shaft.

3. An artificial fish bait comprising a body, a spindle mounted for relative rotation, and a hook connected with the spindle, said hook and body or either of them being detachable.

4. An artificial fish bait comprising a body, and a spindle mounted in the body for relative rotation and having rigid therewith at each end of the body a means of attraction, one of said means being adapted to rotate the shaft.

5. A bait of the class described comprising a body, a spindle rotatable relative to the body, and a hook detachably connected with the spindle.

6. A bait of the class described comprising a body, a spindle rotatable relative to the body, and a hook having a screw-threaded engagement with the spindle within the body.

7. A fish bait of the class described comprising a spindle, means adapted to rotate the spindle, and a hook having a shank with a screw-threaded connection with the spindle.

8. A fish bait comprising a body, a shaft extending longitudinally through the body and adapted for relative rotation, a spinner fast upon the shaft and adapted to engage the forward end of the body, and a collar also rigid with the shaft and adapted to engage the rear end of the body, said collar being removable to permit the detachment of the body from the shaft.

9. A fish bait comprising a body, a spindle relatively rotatable in the body, and means detachable with respect to the shaft and including a member adapted to engage with the rear end of the body for normally holding the body on the spindle.

10. A fish bait comprising a body, a spindle relatively rotatable in the body, and a hook connected with the spindle, said hook being detachable and permitting when detached the removal of the body from the spindle.

11. A fish bait having a body adapted to maintain a normal upright floating position and having a through longitudinal bore, a hook, and means for rotating the hook including a spindle inserted into said bore.

12. An artificial bait comprising a body arranged to maintain an upright floating position, a spindle, means for rotating the spindle in the body, and a line connection providing a ball and socket joint adapted to permit of the rotation of the spindle.

13. A fish bait having a body with a through longitudinal bore, bushings at the opposite end of the body, and a shaft journaled in said bushings and adapted to be rotated as the bait is drawn through the water.

14. An artificial bait comprising a body adapted to maintain an upright floating position, a spindle arranged to rotate relative to the body as the bait is drawn through the water, and means of attraction fast upon said spindle.

15. An artificial bait comprising a body, a spindle arranged to rotate relative to the body as the bait is drawn through the water, and means permitting the detachment of the body at will.

16. An artificial bait comprising a body, a spindle arranged to rotate relative to the body as the bait is drawn through the water, and means permitting the detachment of the body at will including a hook having a detachable connection with the spindle.

In testimony whereof, I have hereunto affixed my signature.

JAMES A. ROLAND.